3,367,870
METHOD OF STABILIZATION WITH CARBON-BONDED PHOSPHORUS DERIVATIVES AND COMPOSITIONS STABILIZED THEREBY
John D. Spivack, Spring Valley, N.Y., assignor to Geigy Chemical Corporation, Greenburgh, N.Y., a corporation of Delaware
No Drawing. Application Apr. 5, 1965, Ser. No. 445,765, which is a continuation-in-part of application Ser. No. 308,345, Sept. 12, 1963. Divided and this application Mar. 4, 1966, Ser. No. 531,785
17 Claims. (Cl. 252—49.8)

This application is a division of copending application Ser. No. 445,765, filed Apr. 5, 1965, now U.S. Patent No. 3,281,505 which is a continuation-in-part of copending application Ser. No. 308,345, filed Sept. 12, 1963, now abandoned, which is in turn a continuation-in-part of copending application Ser. No. 187,207, filed Apr. 13, 1962, now abandoned, which in turn is a continuation-in-part of copending application Ser. No. 102,958, filed Apr. 14, 1961, now abandoned.

This invention relates to a method of stabilization with a carbon-bonded phosphorus derivative and to novel compositions stabilized thereby. More particularly this invention pertains to novel, substituted phosphonates and to compositions containing the same.

Natural or synthetic resins, such as polypropylene and polyethylene, are often subject to oxidative deterioration. Other unstable organic materials, such as synthetic lubricants, hydrocarbons, natural and synthetic rubbers, oils of animal or vegetable origin, and the like are also unstable to thermal and/or oxidative deterioration. Such materials may also be unstable to ultraviolet and/or visible light.

It is an object of the present invention therefore, to provide stable organic material by incorporating in organic material normally subject to deterioration, a stabilizing amount of a stabilizer as herein described. Other objects of the invention will be apparent from what follows hereinafter.

It has been found that the compounds of this invention are effective in various organic materials, normally subject to oxidative deterioration. The stabilizers of the invention comprise phosphonates of the formula:

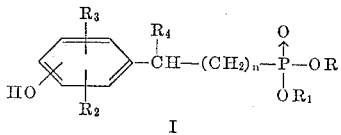

I wherein $n$ is 0 or 1 and (a) when $n$ is 1,
each of R and $R_1$ is alkyl, preferably alkyl groups having from 12 to 24 carbon atoms, examples of useful alkyl groups represented by R and $R_1$ being methyl, ethyl, isopropyl, propyl, butyl, secondary butyl, tertiary butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, heneicosyl, docosyl, tricosyl, tetracosyl, and the like,
$R_2$ and $R_3$ each independently represents alkyl, e.g. alkyl having from 1 to 18 carbon atoms, preferably having from 1 to 6 carbon atoms, especially tertiary butyl; examples of useful alkyl groups being methyl, ethyl, propyl, isopropyl, butyl, secondary butyl, tertiary butyl, pentyl, hexyl, heptyl, octyl, nonyl, decyl, undecyl, dodecyl, tridecyl, tetradecyl, pentadecyl, hexadecyl, heptadecyl, octadecyl, and the like; and (b) when $n$ is 0,
$R_2$, OH and $R_3$ are fixed, respectively, in the 3, 4 and 5 positions of the benzene ring portion of the benzylphosphonate, each of R and $R_1$ is higher alkyl of from 14 to 30 carbon atoms, preferably 14 to 22; particularly R and $R_1$ may be the same or different alkyl groups but in any event will contain at least 14 carbon atoms; and representative of such higher alkyl groups are tetradecyl, pentadecyl, hexadecyl, heptadecyl, octadecyl, nonadecyl, eicosyl, heneicosyl, docosyl, and the like up to triacontyl;

$R_2$ is alkyl of 1 to 6 carbon atoms, and preferably a large bulky alkyl group such as a tertiarybutyl group;

$R_3$ is tertiary butyl; and $R_4$ is hydrogen or methyl.

In the foregoing series of compounds represented by the Formula I, wherein $n$ is 1, those with the hydroxyl group in the ortho or para positions with respect to the carbon-substituted phosphorous group are preferred.

The groups $R_2$ and $R_3$ may be the same or different alkyl groups. If $n$ is 1, it is preferred that at least one ($R_2$) and preferably both will always be ortho to the hydroxy group on the phenyl group in Formula I. One and preferably both of $R_2$ and $R_3$ should be a bulky group such as t-butyl or t-octyl. Thus while the preferred arrangement comprises a 2,6-di-t-butylphenolic moiety, such arrangements as t-butyl group in one position ortho to the hydroxy group and methyl in the other position ortho to the hydroxy group are also envisioned.

As previously stated, the compounds of the present invention are useful in the stabilization of organic material normally subject to deterioration. For example, compounds of the Formula I are surprisingly more effective in stabilizing films and filaments or fibers of polyolefins, such as polypropylene than the compounds of the prior art. The efficacy of these compounds is evident from the greatly increased stability of monofilaments of polymeric material containing a compound of this invention when subjected to oxidative deterioration. In this specification it is understood that polymeric material includes polyhaloolefins, e.g. polyvinyl chloride, and polyolefins, such as polyethylene, polypropylene, polybutene, polyamides, such as nylon, polyesters, polyurethanes, polyvinyl acetate, polyacrylates, polymethacrylates, and the like, preferably those which are normally solid at room temperature. In addition, the polyolefins are preferably of high molecular weight; e.g. above one thousand into the hundreds of thousands range. The polyethylenes may be of the high density, medium density or low density class. The preferred polymeric material for stabilization is polypropylene.

It is known in the art that certain dialkylhydroxybenzyl phosphonates somewhat related structurally to the instant compounds wherein $n$ is 0, have valuable stabilization properties in organic media. Thus Goddard et al., U.S. 3,006,945, filed Sept. 1, 1960, have claimed a method for preparing compounds having the formula:

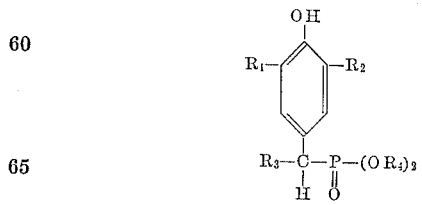

wherein $R_1$ is an alkyl radical having from 1 to 12 carbon atoms, $R_2$ is an alkyl radical having from 3 to 12 carbon atoms, $R_3$ is selected from the group consisting of hydrogen, alkyl radicals having from 1 to 12 carbon atoms and mononuclear aryl radicals having from 6 to 12 carbon atoms and $R_4$ is an alkyl radical having from 1 to 12 carbon atoms.

Goddard teaches that his method of making dialkyl (3,5 - dialkyl - 4 - hydroxybenzyl)phosphonates provides stabilizers which are extremely useful as antioxidants. He shows specific data to indicate that for those compounds wherein $R_4$ contains from 1 to 6 carbon atoms, the deleterious increase in acidity and viscosity of lubricating oils is markedly inhibited under extreme oxidation conditions.

It has now been found, surprisingly, that stabilizers of even superior properties are obtained by proper selection of the chain length of $R_4$. Thus, compounds containing groups designated $R_4$ by Goddard et al. but which have 14 and more, even up to 30 carbon atoms, are superior stabilizers when tested and compared against their useful compounds in which $R_4$ has 12 carbon atoms. This unexpected improvement in properties affords a number of advantages in the use of the instantly claimed compounds. Compared with the $C_{12}$ compound of Goddard et al., much less stabilizer is needed to obtain comparable protection, and the time of protection at comparable stabilizer concentrations is greatly extended.

As can be seen from the results listed in Table I, 2-mil oriented filaments of polypropylene containing a compound of this invention with 14 carbon atoms in the alkyl group are stabilized to a significantly greater extent than polypropylene filaments stabilized with the most closely related Goddard et al. compound, containing 12 carbon atoms in the alkyl group.

TABLE I.—STABILIZATION BY 2 MIL ORIENTED POLYPROPYLENE FIBERS AT 149° C.

| Concentration, percent by weight | Stabilizer | |
| --- | --- | --- |
| | $R_4=12$, hours to failure | $R_4=14$, hours to failure |
| 1.0 | 54 | 79 |
| 0.5 | 28 | 50 |
| 0.3 | 8 | 17 |
| 0.2 | 8 | 13 |
| 0.1 | 0.37 | 2.2 |
| Blank | (¹) | (¹) |

Stabilizer structure: 3,5-di-t-butyl-4-hydroxybenzyl group with $-CH_2-P(=O)(OR_4)_2$ ¹ Fails; cannot be extruded.

It is noteworthy that the longer stabilization properties are found to be consistent as the stabilizer concentration is decreased. Particularly remarkable is the six-fold increase in stabilization provided by the instant compound at the most economical use level, 0.1%. The experimental method for obtaining this showing will be exemplified in detail hereafter.

A further demonstration of the surprisingly superior stabilizing properties of one of the instant compounds in comparison with its most closely related Goddard et al. compound has been found in 6.5 mil oriented polypropylene fibers. The test method, which will be exemplified in detail, comprises stretching oriented filaments of polypropylene containing the compounds to be tested as stabilizers in an oven at 149° C. and noting the time at which the filament snaps and fails. This method is used to determine the usefulness of stabilized polypropylene fibers in automobile seat covers, in webbing for indoor and outdoor furniture, in upholstery, and the like. The filament stabilized by 0.5% by weight of a compound of this invention wherein $R_4$ as designated by Goddard et al. would be $C_{14}$, i.e. di-n-tetradecyl-3,5-di-t-butyl-4-hydroxybenzyl phosphonate, does not break until after 70 hours in the oven. The filament stabilized by the addition of 0.5% by weight of the compound of Goddard et al. in which $R_4$ is $C_{12}$, i.e. di-n-dodecyl-3,5-di-t-butyl-4-hydroxybenzyl-phosphonate, on the other hand, while efficiently stabilized compared to the blank, fails after 35 hours. Thus it is seen that the instant compound provides a two-fold improvement in this important property over Goddard et al.'s most closely related stabilizer.

Other manifestations of the increase in stabilization efficiency between the instant $C_{14}$ compounds and the Goddard et al. $C_{12}$ compounds have been found in comparisons of the times of stabilization of plastics films containing them, when exposed to high temperatures. Thus in a tubular oven air flow of 400 cubic feet per minute at 300° F. polypropylene films containing 0.5% by weight of the instant $C_{14}$ stabilizer, di-n-tetradecyl-3,5-di-t-butyl-4-hydroxybenzylphosphonate did not fail until 90 hours, if they were 1 mil thick, and 418 hours, if they were 5 mil thick. In contrast, the $C_{12}$ compound of Goddard et al. at 0.5% by weight stabilized the polypropylene films for 53 hours, if they were 1 mil thick, and for 295 hours, if they were 5 mil thick. Thus, while the compound of Goddard et al. efficiently stabilized the plastic film, the instant compound provided substantially longer protection.

Stabilized polymeric materials, such as those mentioned hereinabove, find use as thermoplastic molding or coating agents. Moreover, because of their high dielectric strength and their resistance to water, such materials are particularly useful as insulators or dielectrics in condensers and similar equipment. It is known that these polyolefins, such as polyethylene and polypropylene, are attacked by oxygen, particularly when exposed to the atmosphere and at elevated temperatures.

During use or manufacture, for example, the desirable properties of the polyolefins are often impaired by oxidative deterioration. Such degradation causes loss in dielectric properties, discoloration, embrittlement, gelation, and the like. In addition to overcoming these difficulties, the compositions of this invention are also stabilized against degradation caused by heat and light.

Not only homopolymeric material, but also copolymers and physical mixtures thereof, are stabilized according to the present invention. For example, high impact polystyrene containing copolymers of butadiene and styrene may be stabilized according to the invention.

The compounds of this invention are also particularly useful in stabilizing lubricating oils of various types including aliphatic esters, polyalkylene oxides, silicones, esters of phosphoric and silicic acids, highly fluorine-substituted hydrocarbons, and the like. Specifically, such aliphatic esters which are usefully stabilized comprise dihexyl azelate, di - (2 - ethylhexyl) azelate, di(3,5,5 - trimethylhexyl) glutarate, di-(3,5,5-trimethylpentyl) glutarate, di-(2-ethylhexyl) pimelate, di(2-ethylhexyl) adipate, diisoamyl adipate, triamyl tricarballylate, pentaerythritol tetracaproate, dipropylene glycol dipelargonate, 1,5-pentanediol di-(2-ethylhexanoate), and the like. Other specific lubricants include polyisopropylene oxide, polyisopropylene oxide diether, polyisopropylene oxide diester, and the like, as well as methyl silicone, methylphenyl silicone, tetraisooctyl silicate, etc. and fluorinated oils, such as perfluorohydrocarbons.

The present invention also relates to the stabilization of fatty materials, including oils of animal or vegetable origin, which tend to deteriorate on standing or exposure to atmospheric oxygen. Also within the scope of the invention are saturated and unsaturated hydrocarbons which tend to deteriorate on storage and use, such as for example, gasolines, jet fuels, diesel oils, mineral oils and the like. Such hydrocarbons are protected against gum formation, discoloration and other deterioration with the phosphonate stabilizers of the present invention. Greases and cutting oils may also be stabilized in the same fashion.

Particularly preferred stabilizers of the invention are di-n-docosyl 3,5-di-t-butyl-4-hydroxybenzylphosphonate, di-n-hexadecyl 3,5 - di-t-butyl-4-hydroxybenzylphosphonate, di-n-octadecyl 3,5-di-t-butyl-4-hydroxybenzylphosphonate and di-n-dodecyl - 2 - (3′,5′-di-t-butyl-4′-hydroxyphenyl)-ethane phosphonate. These compounds are especially useful in stabilizing polyolefinic material, particularly polypropylene. Synthetic oils, such as trimethylol propane esters of acetic acid, n-valeric acid, hexanoic acid, caprylic acid, pelargonic acid, 2-ethylhexanoic acid, 2-ethylpropanoic acid, and 2-methylpentanoic acid, and mixtures thereof are also effectively stabilized with the foregoing stabilizers.

The substituted phosphonate stabilizers of the invention are also useful in stabilizing rubber, e.g. artificial and natural rubber. Other examples of rubber which may be stabilized according to the invention include polybutadiene rubber, polyisoprene rubber, styrenebutadiene rubber, butyl rubber, nitrile rubber, neoprene rubber and blends of artificial rubber with natural rubber, such as for example natural rubber with polybutadiene rubber. In fact, the stabilization of any rubber normally subject to degradation is within the scope of the present invention.

In general, stabilizers of the invention are employed in a concentration of from about 0.01% to about 10% by weight, preferably from about 0.1% to about 1% by weight. The specific concentration employed varies with the unstabilized material and the specific stabilizer. When mixtures of two or more stabilizers are employed in an unstable material, usually the total amount of added stabilizer does not exceed 10% of the total stabilized material.

The substituted phosphonate stabilizers of this invention may be used also to stabilize organic material in combination with other additive agents, such as e.g. antioxidants, antiozonants, pourpoint depressants, corrosion and rust inhibitors, dispersing agents, chelating agents, surface active agents, demulsifiers, anti-foaming agents, carbon black, accelerators, plasticizers, color stabilizers, heat stabilizers, ultra-violet absorbers, dyes and pigments, fillers, etc.

In compounds of Formula I wherein $n$ is 0, when R and $R_1$ are the same, the compounds of this invention are preferably prepared by treating a phenolic alkyl halide of the formula:

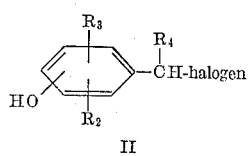

II in which $R_2$, $R_3$ and $R_4$ are as above defined and halogen is preferably chlorine or bromine, with a tertiary phosphite of the formula:

$$P(OR)_3 \text{ or } P(OR_1)_3$$

III in which R and $R_1$ are as above defined.

When R and $R_1$ are different, a convenient synthetic route consists of treating a phosphonyl monohalide with the appropriate alcohol of the formula:

$$ROH$$

IV

For example:

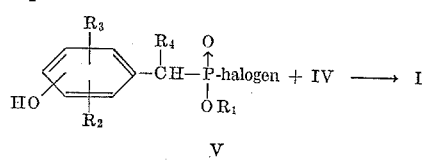

V

Other suitable synthetic routes include the reaction of a phenolic alkyl halide (II) and an alkali or alkaline metal salt of a dialkyl phosphite, the reaction of a phenolic alkyl magnesium halide and a dialkyl halophosphite, the transesterification of phenolic alkyl phosphonate diesters, the esterification of phenolic alkyl phosphonic acids and phenolic alkyl phosphonyl halides, the controlled oxidation of phenolic alkyl phosphonite diesters, and like types.

The stabilizer compounds of this invention of Formula I wherein $n$ is 1 may be prepared by the reaction of a tertiary phosphite with a dialkylhydroxyphenylethyl halide. This reaction may be represented as follows:

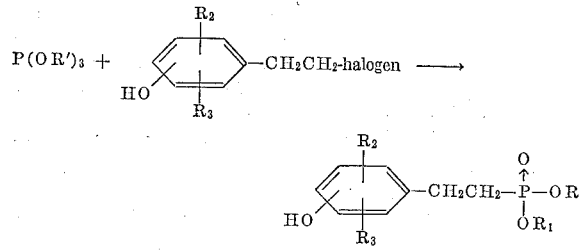

wherein R′ is alkyl groups comprised by R and $R_1$ and $R_2$ and $R_3$ are as above defined. The halogen is preferably a chlorine or a bromine atom.

Special mention is made of an embodiment of this invention which are compounds of the formula:

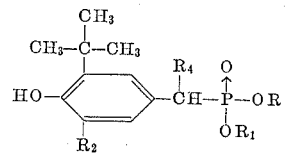

wherein each of R and $R_1$ is alkyl of from 14 to 30 carbon atoms, $R_2$ is alkyl of from 1 to 6 carbon atoms, and $R_4$ is a member selected from the group consisting of hydrogen and methyl.

Still another embodiment specifically contemplated by this invention are compounds of the formula:

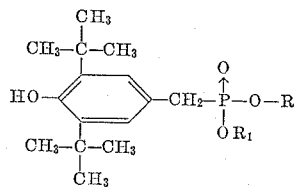

wherein each of R and $R_1$ is alkyl of from 14 to 30 carbon atoms.

The following examples are illustrative of the invention but are not meant to limit the scope of same. In said examples, parts are by weight unless otherwise indicated and the relationship between parts by weight and parts by volume is as that between grams and cubic centimeters. The temperatures are in degrees centigrade.

*Example 1.—2-t-butyl-4-chloromethyl-6-methylphenol*

Gaseous hydrogen chloride is bubbled through a dispersion of 46.8 parts of paraformaldehyde in 80 parts by volume of glacial acetic acid at a temperature of 15 to 22° over a period of 25 minutes. The reaction mixture is cooled to —12° and 81.6 parts of 2-methyl-6-t-butylphenol dissolved in 40 parts by volume of glacial acetic acid are added in a dropwise fashion at —90° over a period of 1.5 hours while a rapid stream of gaseous hydrogen chloride is passed through the reaction mixture. After the addition is complete, the reaction mixture is stirred for 30 minutes, and 80 parts by volume of water are added at —8°. The lower layer is discarded while the upper layer is washed with saturated sodium chloride solution, freed of a small amount of turbidity by centrifugation, and dried over anhydrous magnesium sulfate. The drying agent is removed by filtration and the solvents removed by distillation at 0.2 to 2 mm. under nitrogen. The residual 2-t-butyl-4-chloromethyl-6-methylphenol (62 parts) is obtained as a viscous brown oil of 87% purity and is employed for synthesis without further purification.

*Example 2.—2,6-di-t-butyl-4-chloromethylphenol*

Gaseous hydrogen chloride is bubbled through a dispersion of 19.5 parts of paraformaldehyde (0.65 mole) in 1000 parts by volume of glacial acetic acid at 15 to 20°. A clear solution results after 20 minutes. One hundred and three parts of 2,6-di-t-butylphenol (0.5 mole) dissolved in 50 parts by volume of glacial acetic acid are added over a period of 5 minutes at 17 to 30°, the introduction of hydrogen chloride being continued during this time. After the addition is complete, the reaction mixture is stirred at 25 to 27° for 45 minutes while hydrogen chloride is being introduced. The two phase reaction mixture is then separated, the lower acetic acid water layer (about 130 parts by volume) being set aside. The upper layer is taken up in 150 parts by volume of benzene, washed successively with saturated sodium chloride solution, saturated sodium bicarbonate solution and 9% sodium bisulfite solution, and finally dried over anhydrous magnesium sulfate. The drying agent is removed by filtration and the clear benzene solution freed of any residual solvent by distillation at 15 to 30 mm. under nitrogen. The residual material, consisting of 104 parts, is further purified by distillation, B.P. 118–121°/0.8–0.9 mm., the 2,6-di-t-butyl-4-chloromethylphenol so obtained being a yellow oil of 97 to 98% purity.

*Example 3.—2,6-di-t-butyl-4-α-chloroethylphenol*

Gaseous hydrogen chloride is bubbled through a solution of 57 parts of acetaldehyde (1.3 moles) in 100 parts by volume of glacial acetic acid at −5 to +10°. After 20 minutes, the initial exothermic reaction subsides and 103 parts of 2,6-di-t-butylphenol dissolved in 50 parts by volume of glacial acetic acid are added in a dropwise fashion over a period of 1.5 hours, the temperature being maintained at 15 to 16°. Stirring is continued at room temperature for 45 minutes, gaseous hydrogen chloride being passed through the reaction mixture during the addition and subsequent stirring periods. The two phase reaction mixture is then separated, the lower acetic acid water layer being discarded. The upper layer is taken up in 100 parts by volume of benzene, the benzene solution being washed successively with water and saturated sodium chloride solution and dried over anhydrous magnesium sulfate. The benzene solution is filtered and the clear filtrate freed of solvent by initial distillation in vacuo under nitrogen at 30° at 40 mm., with final traces being removed at 0.2 mm. The residual 2,6-di-t-butyl-4-α-chloroethylphenol is obtained as a viscous brown liquid (about 120 parts) of 93% purity and can be used as such without further purification.

*Example 4.—Di-n-octadecyl 3-t-butyl-4-hydroxy-5-methylbenzylphosphonate*

A mixture of 7.3 parts of 87% 6-t-butyl-4-chloromethyl-2-methylphenol (0.03 mole) and 25.1 parts of trioctadecylphosphite is melted at 90° for 10 minutes and then heated at 130° under nitrogen for 40 minutes in vacuo at 0.3 mm. The reaction product becomes lighter in color and is then heated at 155° to 180° for one hour. Dimethylaniline (0.5 part) is then added and the mixture distilled with a pot temperature of 190 to 215°. Fifty-five parts of distillate are thus removed, B.P. 140–151°/0.3 mm. The residual crude product (26 parts) is dissolved in acetone and unreacted starting material, trioctadecylphosphite, is removed by crystallization. The filtrate yields the product as white crystals, M.P. 65–69°. Upon successive recrystallization from acetone, the di-n-octadecyl 3-t-butyl-4-hydroxy-5-methylbenzylphosphonate is further purified and demonstrates a melting point of 69–71°.

*Example 5.—Di-n-octadecyl 1-(3,5-di-t-butyl-4-hydroxyphenyl)-ethanephosphonate*

A mixture of 7.2 parts of 93% 2,6-di-t-butyl-4-α-chloroethylphenol (0.025 mole, Example 3) and 21 parts of trioctadecyl phosphite is heated at 130° for 2 hours under nitrogen at 40 mm. The by-product, octadecyl chloride, is then removed by distillation in vacuo, B.P. 130–135°/0.5 mm. The residual product (21.5 parts) is dissolved in about 60 parts by volume of hexane and cooled in an ice-water bath. The insoluble precipitate is removed and the filtrate evaporated to dryness. The residual oil (9.9 parts) is triturated five times with a total of 70 parts by volume of acetonitrile. Successive recrystallization of the triturated residue from acetone thus yields di-n-octadecyl 1-(3,5-di-t-butyl-4-hydroxyphenyl)-ethanephosphonate as white crystals, M.P. 72–74°.

*Example 6.—Di-n-tetradecyl 3,5-di-t-butyl-4-hydroxybenzylphosphonate*

Tri-n-tetradecyl phosphite (58.2 parts) is melted under nitrogen in a three-neck flask fitted with a stirrer, nitrogen inlet tube and condenser. There are then added 23.45 parts (0.08 mole) of an 86.5% solution of 2,6-di-t-butyl-4-chloromethylphenol in heptane at a temperature of 75–80°. The reactants are heated at 80° for 6 hours and the temperature then gradually raised to 150° over 3 hours, the heptane distilling off during this time. The mixture is then initially distilled at 80–90°/3–0.5 mm. for 2 hours and then at 200°/0.1 mm. for 1 hour, thus removing about 17.7 parts of tetradecyl chloride. The residual material is then further distilled in an "Asco Rotafilm" molecular still at 210°/1 micron. A light yellow oily distillation residue comprising di-n-tetradecyl 3,5-di-t-butyl-4-hydroxybenzylphosphonate is thus obtained weighing 48.7 parts which after repeated recrystallizations from acetone, appears as a white solid, M.P. 40–42°.

*Example 7.—Di-n-hexadecyl 3,5-di-t-butyl-4-hydroxybenzylphosphonate*

Tri-n-hexadecylphosphite (63.8 parts) is melted under nitrogen in a three neck flask fitted with a stirrer, nitrogen inlet tube and condenser. There is then added 23.27 parts (0.079 mole) of an 86.5% solution of 2,6-di-t-butyl-4-chloromethylphenol in heptane at 75–80°. The reactants are heated at 80° for 6 hours and the temperature then gradually raised to 150° over 3 hours during which time most of the heptane distills. The residual material is then distilled at 160°/15 mm. for 2½ hours and finally distilled in an "Asco Rotafilm" molecular still at 190°/1 micron. After repeated trituration of the distillation residue with cold acetone (5°) and one recrystallization from acetone, di-n-hexadecyl 3,5-di-t-butyl-4-hydroxybenzylphosphonate is obtained as a white solid melting at 44–46.5°.

*Example 8.—Didocosyl 3,5-di-t-butyl-4-hydroxybenzylphosphonate*

Tridocosyl phosphite (65.6 parts) is melted under nitrogen in a three neck flask fitted with a stirrer, nitrogen inlet tube and condenser. There are then added 17.5 parts (0.060 mole) of an 86.5% solution of 2,6-di-t-butyl-4-chloromethylphenol in heptane at 75–80°. The reaction mixture is heated at 80° for 6 hours. The temperature is then raised gradually to 150° over 3 hours, during which time most of the heptane distills. The mixture is then distilled, first at 90°/0.4 mm. for 2½ hours and then in a molecular still at 230°/1 micron. There is thus obtained 60.6 parts of a light colored solid residue and 18 parts of docosyl chloride. After repeated recrystallization from acetone, the solid residue yields didocosyl 3,5-di-t-butyl-4-hydroxybenzylphosphonate as a white solid, M.P. 45–48°.

*Example 9.—Di-n-octadecyl 3,5-di-t-butyl-4-hydroxybenzylphosphonate*

A solution of 12.6 parts of 94% 2,6-di-t-butyl-4-chloromethylphenol (0.05 mole) in 10 parts by volume of hexane is added to 41.9 parts of tri-n-octadecylphosphite (0.05 mole) in a three neck flask fitted for vacuum distillation with a capillary bleed tube, stillhead and condenser. The charge is kept under nitrogen at 15 mm. at room temperature to remove the hexane and then melted together at 110°/0.5 mm. for 15 minutes, then at 150°/0.2 mm. for 30 minutes. The reaction charge is next heated over a range of 171° to 194° to remove octadecyl chloride (131–133°/0.15–0.18 mm.). The residue is a light yellow oil (while molten) weighing 40 parts. After successive recrystallization from n-hexane and acetone, di-n-octadecyl 3,5-di-t-butyl-4-hydroxybenzylphosphonate is obtained as a white crystalline solid, M.P. 55–57°.

Di-n-octadecyl 3,5-di-t-butyl-4-hydroxybenzylphosphonate is also obtained by reacting 2,6-di-t-butyl-4-chloromethylphenol with the sodium derivative of di-n-octadecylphosphite in xylene.

*Example 10.—Stabilization of polypropylene*

Unstabilized polypropylene powder (Hercules Profax 6501) is thoroughly blended with 0.5% by weight of di-n-octadecyl 3,5-di-t-butyl-4-hydroxybenzylphosphonate. The blended material is then milled on a two roller mill at 182° for 5 minutes, after which time the stabilized polypropylene is sheeted from the mill and allowed to cool.

The milled polypropylene sheet is then cut into small pieces and pressed for 7 minutes on a hydraulic press at 218° and 2000 pounds per square inch pressure. The resultant sheet of 25 mil thickness is then tested for resistance to accelerated aging in a forced draft oven at 149°. The resultant composition of 0.5% by weight of di-n-octadecyl 3,5-di-t-butyl-4-hydroxybenzylphosphonate and polypropylene is stabilized against oxidative deterioration for over 500 hours. The unstabilized polypropylene deteriorates after only 3 hours.

In like manner as the foregoing, stable compositions of polypropylene are prepared having 0.5% by weight of the following compounds:

Di-n-octadecyl 3-t-butyl-4-hydroxy-5-methylbenzylphosphonate,
Di-n-octadecyl 1-(3,5-di-t-butyl-4-hydroxyphenyl)-ethanephosphonate,
Di-n-tetradecyl 3,5-di-t-butyl-4-hydroxybenzylphosphonate,
Di-n-hexadecyl 3,5-di-t-butyl-4-hydroxybenzylphosphonate,
Di-n-docosyl 3,5-di-t-butyl-4-hydroxybenzylphosphonate.

*Example 11.—Stabilization of polyethylene*

Unstabilized polyethylene powder (HIFAX 1701 flake) is thoroughly blended with 0.1% by weight of di-n-octadecyl 3,5-di-t-butyl-4-hydroxybenzylphosphonate made according to Example 9. The blended material is then milled on a two roller mill at 163° for 5 minutes, after which time the stabilized polyethylene is sheeted from the mill and allowed to cool.

The milled polyethylene sheet is then cut into small pieces and pressed for 5 minutes on a hydraulic press at 166° and 175 pounds per square inch pressure. The resultant sheet of 25 mil thickness is then cut into small pieces 1 mm. x 1 mm. and 1 part of these pieces is mixed with 15 parts of sand and this mixture is charged into a Sligh oxidation flask. The flask is charged with oxygen and the whole immersed in an oil bath at 140°. Oxygen absorption is observed with a mercury manometer; a pressure drop of 55 mm. mercury is taken as the end of the induction period.

The so-stabilized high density polyethylene is protected against deterioration for more than 10 hours while the unstabilized polyethylene fails after 5 hours.

In like manner a stable composition of low density polyethylene (Tenite 860) is prepared with 0.1% by weight of di-n-octadecyl 3,5-di-t-butyl-4-hydroxybenzylphosphonate. The so-stabilized low density polyethylene is protected against deterioration for more than 40 hours, while the unstabilized polyethylene fails after only 4 hours.

*Example 12.—Stabilization of vegetable oil*

A stabilized peanut oil is prepared with 0.05% by weight of di-n-octadecyl 3,5-di-t-butyl-4-hydroxybenzylphosphonate. This mixture is tested for stability by measuring the drop in pressure within a closed vessel containing the stabilized oil, and charged with oxygen at atmospheric pressure and room temperature. The vessel is then heated in an oil bath at 115°. The end of the induction period is taken at a drop of 60 mm. The so-stabilized oil is protected against oxidative deterioration for more than 4.5 hours, while the unstabilized oil fails after 2.9 hours.

*Example 13.—Stabilization of synthetic lubricant*

A stabilized high temperature synthetic type lubricating oil is prepared by incorporating 1% by weight of di-n-octadecyl 3,5-di-t-butyl-4-hydroxybenzylphosphonate into the synthetic oil, which comprises a mixture of trimethylol propane esters of the following acids:

|  | Percent by weight |
|---|---|
| Acetic acid | 20.0 |
| n-Valeric acid | 23.1 |
| Branched $C_6$ acid | 3.5 |
| Pelargonic acid | 48.2 |
| Caprylic acid | 0.9 |
| Other acids | 4.3 |

The stabilized composition (100 parts by volume) is compared with the unstabilized synthetic oil (100 parts by volume) by heating at 260° in the presence of air and two iron washers, 1 inch in diameter. The air is bubbled through the liquid at 5 liters per hour for 6 hours in each case. The blank increases in acid number from an initial number of 0.06 to a value of 20.4. The stabilized synthetic oil increases from an initial acid number of 0.08 to a value of 4.4. The viscosity of the unstabilized oil increases by about 20%, whereas the stabilized oil is substantially unchanged in viscosity.

*Example 14.—Stabilization of rubber*

A 4% by weight crepe rubber solution in toluene is prepared containing 2% by weight of di-n-octadecyl 3,5-di-t-butyl-4-hydroxybenzylphosphonate, based upon the weight of the rubber. The resulting solution is spread on a clean glass slide and the solvent evaporated at 50°. The slide is placed in a forced draft oven at 150° for 3 hours and removed. Stabilization is judged by the tackiness of the aged rubber relative to the blank. An effective stabilizer will prevent tackiness from occurring and di-n-octadecyl 3,5-di-t-butyl-4-hydroxybenzylphosphonate is found to be effective in stabilizing the rubber.

*Example 15.—2,6-di-t-butyl-4-(β-chloroethyl)phenol*

(a) *Methyl - 3,5 - di-t-butyl-4-hydroxyphenylacetate.*— Gaseous hydrogen chloride is bubbled through a solution of 108.3 parts of 2,6-di-t-butyl-4-hydroxy benzylcyanide (0.45 mole) dissolved in 700 parts by volume of methanol at —5° over a period of about 1 hour. The reaction mixture is then stirred at —5° to 0° for four hours, at 8° for 1 hour and then allowed to warm to room temperature. 2000 part of water is gradually added at 20 to 25°. The yellow dispersion is cooled to 10°, the yellow solid filtered and washed free of acid with water. The aqueous wash water yields a little white precipitate which is combined with the main portion of yellow solid. The solid is dispersed in water and let stand for four days at room temperature. The dispersion is heated at 65 to 70° for 1.5 hours; the yellow solid is filtered, washed nearly free of halogen and dried in the vacuum oven at 50° at 100 mm. Hg pressure, yielding 108 parts of methyl-3,5-di-t-butyl-4-hydroxyphenylacetate melting at 80 to 85°. The ester is purified by distillation boiling at 135° at 0.3 mm. Hg pressure. The methyl-3,5-di-t-butyl-4-hydroxyphenylacetate so obtained melts at 83 to 85°.

(b) *2,6-di-t-butyl-4-(β-hydroxyethyl)phenol.*—11 parts of lithium aluminum hydride (0.29 mole) are dispersed in 900 parts by volume of dry diethyl ether in a dry 3-neck flask fitted with a stirrer, dropping funnel, the apparatus being protected from atmospheric moisture by calcium chloride drying tubes. The ether is warmed to reflux temperature with stirring, a fine dispersion of lithium aluminum hydride being obtained. 97 parts of methyl-3,5-di-t-butyl-4-hydroxyphenylacetate dissolved in 300 parts by volume of dry diethyl ether is added dropwise so that gentle reflux is maintained, precipitating a gelatinous precipitate. The reaction mixture is then heated under reflux for 4 hours. The reaction mixture is cooled to room temperature and the unreacted lithium aluminum hydride decomposed by the cautious addition of 100 parts by volume of ethylacetate, followed by the cautious addition of 200 parts of water. The reaction mixture is maintained at 20°. The reaction mixture is made acid by 400 parts by volume of 10% by volume of sulfuric acid. The clear supernatant ethereal solution is separated from the aqueous phase and washed with 200 parts by volume of 1 N aqueous sodium hydroxide, and by water, the ether solution being dried over anhydrous sodium sulfate. The crude 2,6-di-t-butyl-4-(β-hydroxyethyl)phenol (85.3 parts) is dissolved in 170 parts by volume of ethanol containing 9.8 parts of potassium hydroxide, the alkaline alcohol solution being heated at reflux for 45 minutes. The cooled reaction mixture is poured into 500 parts of water and stirred. The precipitate product is filtered, the solid being washed with water to remove alkali and dried in the vacuum oven at about 60° at 100 mm. Hg pressure. 68 parts of 2,6-di-t-butyl-4-(β-hydroxyethyl)phenol is thus obtained as a light green powder melting at 90–95°. After recrystallization successively from hexane and a solvent mixture of carbon tetrachloride and petroleum ether, the 2,6-di-t-butyl-4-(β-hydroxyethyl)phenol is obtained as a white crystalline solid melting at 99 to 101°.

(c) *2,6-di-t-butyl-4-(β-chloroethyl)phenol.*—57 parts of 2,6-di-t-butyl-4-(β-hydroxyethyl)phenol (0.23 mole) and 1 part of pyridine are dissolved in 250 parts by volume of dry benzene. 47.5 parts of thionyl chloride (0.26 mole) is added dropwise at 35° over a period of 10 minutes. The reactants are then heated at reflux for 3.25 hours. The cooled benzene solution is decanted from the precipitated pyridine hydrochloride and washed successively with saturated aqueous sodium chloride solution, saturated aqueous sodium bicarbonate solution, saturated aqueous sodium chloride solution and dried over anhydrous magnesium sulfate. After removing the benzene solvent at 15 mm. Hg pressure, 62.3 parts of crude 2,6-di-t-butyl-4-(β-chloroethyl)phenol is obtained. The product was distilled at 130 to 147° at 2.6 to 3 mm. Hg and redistilled through a spinning band column boiling at 120° at 0.3 mm. Hg pressure. 2,6-di-t-butyl-4-(β-chloroethyl)phenol is a white solid melting at 66–67°.

*Example 16.—Di-n-dodecyl-2-(3′,5′-di-t-butyl-4′-hydroxy-phenyl)ethane phosphonate*

17.5 parts of trilaurylphosphite (0.03 mole) and 8.1 parts of 2,6-di-t-butyl-4-(β-chloroethyl)phenol are melted together under nitrogen at 70 to 80° to lemon yellow oil. The charge is then heated at 120 to 150° at 0.2 to 0.4 mm. Hg pressure when the color of the reaction product is almost colorless over a period of two hours. The pressure is then increased to 20 mm. Hg and the reaction then heated for 30 minutes at 170°, 30 minutes at 200° and 30 minutes at 230°. The pressure is then increased to 50 mm. Hg and the temperature to 260° and held under these conditions for 2 hours. 5.5 parts of dodecylchloride is then distilled at a vapor temperature of 175° at 35 mm. Hg pressure. The di-n-dodecyl-2-(3′,5′-di-t-butyl-4′-hydroxyphenyl)ethane phosphonate is obtained as a light yellow oil weighing 17 parts. The di-n-dodecyl-2-(3′,5′-di-t-butyl-4′-hydroxyphenyl)-ethane phosphonate is purified further by elution chromatography from a column packed with silica gel and is obtained as a straw-colored viscous oil.

*Example 17.—Comparative stabilization of polypropylene filaments*

Unstabilized polypropylene powder (Profax 6501) is blended with a petroleum ether solution of stabilizer compound to yield a composition containing 0.5% by weight of stabilizer compound based on the total composition after removal of the petroleum ether solvent by evaporation. The resultant resin is pelletized in an extruder at 232° C. to yield ¼ by ³⁄₃₂ inch diameter pellets. These pellets are then extruded once again in the same extruder at 268° C. to yield a filament which is drawn at a ratio of 6 to 1 in order to yield a 6.5 mil oriented filament.

Specimens of the so-prepared filaments are tested by suspending them in an oven at 149° C., with a known weight (0.8 gram) attached, from a 2½ inch loop of each filament. Ten replicates of each test stabilizer in the same filament are used. The average time in hours until break for the ten replicates is taken as the average time in hours required for the same weight to break the so-prepared filament.

The following compounds are tested and the following failure times are noted:

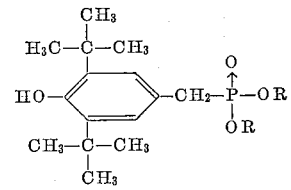

| R: | Filament failure time, 149° C., hrs. |
|---|---|
| $n\text{-}C_{12}H_{25}$ | 35 |
| $n\text{-}C_{14}H_{29}$ | 70 |
| $n\text{-}C_{16}H_{33}$ | >70 |
| $n\text{-}C_{18}H_{37}$ | 80 |
| $n\text{-}C_{22}H_{45}$ | >80 |

The compound wherein R is $n\text{-}C_{12}H_{25}$ is a stabilizer disclosed by Goddard et al. in U.S. 3,006,945. All of the others provide at least a two-fold increase in stabilization time.

The test is repeated, using instead of 6.5 mil filaments, 2 mil filaments and varying the concentration of the stabilizers used from 0.1 through 1.0% by weight. The following results are obtained:

| R | Concentration, percent by weight | | | | |
|---|---|---|---|---|---|
|   | 1.0 | 0.5 | 0.3 | 0.2 | 0.1 |
|   | Filament Failure Time, 149° C., hrs. | | | | |
| $C_{12}$ | 54 | 28 | 8 | 8 | 0.37 |
| $C_{14}$ | 79 | 50 | 17 | 13 | 2.2 |

The $C_{12}$ stabilizer, which is disclosed by Goddard et al. in U.S. 3,006,945, while providing efficient stabilization, is not as effective as the $C_{14}$ compound of this invention which, in some instances, provides at least a two fold increase in time to failure. Particularly remarkable is the six-fold increase in stabilization provided by the instant $C_{14}$ compound at the most economical level, 0.1% by weight.

*Example 18.—Comparative stabilization of polypropylene*

The procedure of Example 10 is repeated to make films of 5 mil and 1 mil thickness containing, respectively, 0.5% by weight of di-n-dodecyl-3,5-di-t-butyl-4-hydroxybenzyl phosphonate, the $C_{12}$ stabilizer taught by Goddard et al. in U.S. 3,006,945, and di-n-tetradecyl-3,5-dit-butyl-4-hydroxybenzyl phosphonate, a $C_{14}$ stabilizer of the instant invention.

The films are subjected to accelerated aging in a forced draft air oven at 149° C. at 400 cubic feet of air flow per minute according to Example 10. Unstabilized films fail within one hour. $C_{12}$ compound of Goddard et al. provides protection for 53 hours in 1 mil thick films and for 295 hours in 5 mil thick films. The instant $C_{14}$ stabilizer provides protection for 90 hours in 1 mil thick films and for 418 hours in 5 mil thick films. Thus the instant $C_{14}$ film provides a substantial increase in stability in comparison with that of Goddard.

What is claimed is:

1. A stabilized composition comprising organic material normally tending to undergo oxidative deterioration and a stabilizing quantity of a compound of the formula:

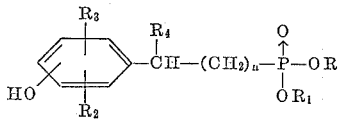

wherein $n$ is 0 or 1, and
(a) when $n$ is 1,
each of R and $R_1$ is alkyl having from 12 to 24 carbon atoms and
each of $R_2$ and $R_3$ is alkyl having from 1 to 6 carbon atoms, and
$R_4$ is hydrogen; and
(b) when $n$ is 0,
$R_2$, OH and $R_3$ are fixed, respectively, in the 3, 4 and 5 positions of the benzene ring portion of the benzylphosphonate;
each of R and $R_1$ is alkyl of 14 to 30 carbon atoms,
$R_2$ is alkyl of from 1 to 6 carbon atoms,
$R_3$ is tertiary-butyl, and
$R_4$ is a member selected from the group consisting of hydrogen and methyl.

2. A stabilized composition according to claim 1 wherein, in said compound, $n$ is 1.

3. A stabilized composition according to claim 1 wherein, in said compound, $n$ is 1, R and $R_1$ are n-dodecyl, $R_2$ is 3-t-butyl, $R_3$ is 5-t-butyl, $R_4$ is hydrogen and OH is fixed in the 5-position.

4. A stabilized composition comprising organic material normally tending to undergo oxidative deterioration and a stabilizing quantity of a compound of the formula:

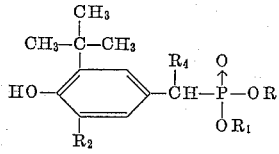

wherein
each of R and $R_1$ is alkyl of from 14 to 30 carbon atoms,
$R_2$ is alkyl of from 1 to 6 carbon atoms, and
$R_4$ is a member selected from the group consisting of hydrogen and methyl.

5. A stabilized composition according to claim 1 wherein said organic material normally subject to oxidative deterioration is selected from polyolefins, polyvinyl chloride, polystyrene, aliphatic ester lubricating oils, animal oils, vegetable oils, hydrocarbons, diene rubber or natural rubber.

6. A stabilized composition according to claim 1 wherein said organic material is a polyolefin.

7. A stabilized composition according to claim 1 wherein said organic material is polypropylene.

8. A stabilized composition according to claim 1 wherein said organic material is polyethylene.

9. A stabilized composition according to claim 1 wherein said organic material is an aliphatic ester lubricating oil.

10. A stabilized composition of matter according to claim 1 wherein said organic material is a compound selected from diene rubber and natural rubber.

11. A stabilized composition of matter according to claim 1 wherein said organic material is polypropylene and wherein, in said compound, R and $R_1$ are n-octadecyl, $R_2$ is t-butyl, $R_4$ is hydrogen and $n$ is 0.

12. A stabilized composition according to claim 1 wherein said organic material is an aliphatic ester lubricating oil and wherein, in said compound, R and $R_1$ are n-octadecyl, $R_2$ is t-butyl, $R_4$ is hydrogen and $n$ is 0.

13. A stabilized composition according to claim 1 wherein said organic material is a compound selected from diene rubber and natural rubber and wherein, in said compound, R and $R_1$ are n-octadecyl, $R_2$ is t-butyl, $R_4$ is hydrogen and $n$ is 0.

14. A stabilized composition according to claim 1 wherein said organic material is polyethylene and wherein, in said compound, R and $R_1$ are n-octadecyl, $R_2$ is t-butyl, $R_4$ is hydrogen and $n$ is 0.

15. A stabilized composition according to claim 4 wherein $R_2$ is t-butyl and $R_4$ is hydrogen.

16. A stabilized composition according to claim 4 wherein each of R and $R_1$ is n-octadecyl, $R_2$ is t-butyl and $R_4$ is hydrogen.

17. A stabilized composition according to claim 4 wherein $R_2$ is t-butyl, $R_4$ is hydrogen and said organic material normally subject to oxidative deterioration is selected from polyolefin, polyvinyl chloride, polystyrene, aliphatic ester lubricating oils, animal oils, vegetable oils, hydrocarbons, diene rubber and natural rubber.

References Cited
UNITED STATES PATENTS

| | | | |
|---|---|---|---|
| 3,006,945 | 10/1961 | Goddard et al. | 252—49.8 X |
| 3,017,422 | 1/1962 | Thompson | 252—49.8 X |
| 3,155,704 | 11/1964 | Knapp | 252—49.8 X |

PATRICK P. GARVIN, *Primary Examiner.*

DANIEL E. WYMAN, *Examiner.*

W. H. CANNON, *Assistant Examiner.*